United States Patent
Estenne et al.

(10) Patent No.: US 9,731,557 B2
(45) Date of Patent: Aug. 15, 2017

(54) AEROPLANE TIRE WITH CROWN AND CARCASS BOTH HAVING A CONCAVE PORTION

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Vincent Estenne, Clermont-Ferrand (FR); Charlotte Caffeau, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 498 days.

(21) Appl. No.: 14/361,442

(22) PCT Filed: Nov. 20, 2012

(86) PCT No.: PCT/EP2012/073033
§ 371 (c)(1),
(2) Date: May 29, 2014

(87) PCT Pub. No.: WO2013/079351
PCT Pub. Date: Jun. 6, 2013

(65) Prior Publication Data
US 2014/0326387 A1    Nov. 6, 2014

(30) Foreign Application Priority Data
Nov. 29, 2011 (FR) ...................................... 11 60892

(51) Int. Cl.
*B60C 3/00* (2006.01)
*B60C 9/02* (2006.01)
(Continued)

(52) U.S. Cl.
CPC .................. *B60C 9/18* (2013.01); *B60C 3/00* (2013.01); *B60C 9/0292* (2013.04); *B60C 9/22* (2013.01);
(Continued)

(58) Field of Classification Search
CPC ..... Y10T 152/10054; Y10T 152/10117; Y10T 152/10126; Y10T 152/10783; B60C 3/00;
(Continued)

(56) References Cited

U.S. PATENT DOCUMENTS 1,534,365 A * 4/1925 Dunn ...................... B60C 17/00
152/158
2,039,092 A * 4/1936 Ledwinka ................. 152/158 X
(Continued)

FOREIGN PATENT DOCUMENTS

JP    06179305 A * 6/1994
JP    07017206 A * 1/1995
(Continued)

OTHER PUBLICATIONS

PCT/EP2012/073033, International Search Report (ISR), Form PCT/ISA/210, dated Jan. 23, 2013 (including English translation), 6 pgs.

*Primary Examiner* — Adrienne C Johnstone
(74) *Attorney, Agent, or Firm* — Dickinson Wright PLLC

(57) ABSTRACT

The tire comprises a tread, a crown reinforcement and at least one crown layer. The crown layer has an axial width ($L_2$) that is at least two-thirds of a maximum axial width ($L_1$) of the tire and has a concave portion with axial limits ($M_2$, $M'_2$) on either side of an equatorial plane (XZ). The tire
(Continued)

further includes a carcass reinforcement which has at least one carcass layer with a concave portion that has axial limits ($M_3$, $M'_3$) on either side of the equatorial plane (XZ). The radial distance (d) between the respective concave portions is at a maximum in the equatorial plane (XZ) and decreases continuously from the equatorial plane (XZ) as far as the axial limits ($M_2$, $M'_2$) of the said concave portions axially closest to the equatorial plane (XZ), where it reaches a minimum value ($d_M$).

13 Claims, 1 Drawing Sheet

(51) Int. Cl.
*B60C 9/22* (2006.01)
*B60C 9/28* (2006.01)
*B60C 9/18* (2006.01)
*B60C 19/00* (2006.01)

(52) U.S. Cl.
CPC ............... *B60C 9/28* (2013.01); *B60C 19/00* (2013.01); *B60C 2009/283* (2013.04); *B60C 2200/02* (2013.04)

(58) Field of Classification Search
CPC B60C 3/04; B60C 9/0292; B60C 9/02; B60C 9/185; B60C 9/1835; B60C 9/18; B60C 9/22; B60C 9/2204; B60C 9/28; B60C 11/22; B60C 11/0083; B60C 11/0008; B60C 11/00; B60C 17/009; B60C 17/00; B60C 17/06–17/066; B60C 2003/005; B60C 2009/283; B60C 2009/0223; B60C 2009/1842; B60C 2009/1857; B60C 2009/1871; B60C 2009/1878; B60C 2009/2209–2009/2295; B60C 2011/0033; B60C 2017/0081; B60C 2017/063; B60C 2200/02
USPC ....... 152/454, 165, 166, 157, 158, 516, 520, 152/209.14, 209.26, 209.1, 538, 531–533, 152/548, 549, 558
See application file for complete search history.

(56) References Cited

U.S. PATENT DOCUMENTS

| | | | |
|---|---|---|---|
| 5,421,390 A | * | 6/1995 | Gerard ................ B60C 3/00 152/209.26 |
| 2011/0214788 A1 | | 9/2011 | Chambriard et al. |

FOREIGN PATENT DOCUMENTS

| | | | |
|---|---|---|---|
| JP | 2002361756 A | * | 12/2002 |
| WO | 2010000747 A1 | | 1/2010 |

* cited by examiner

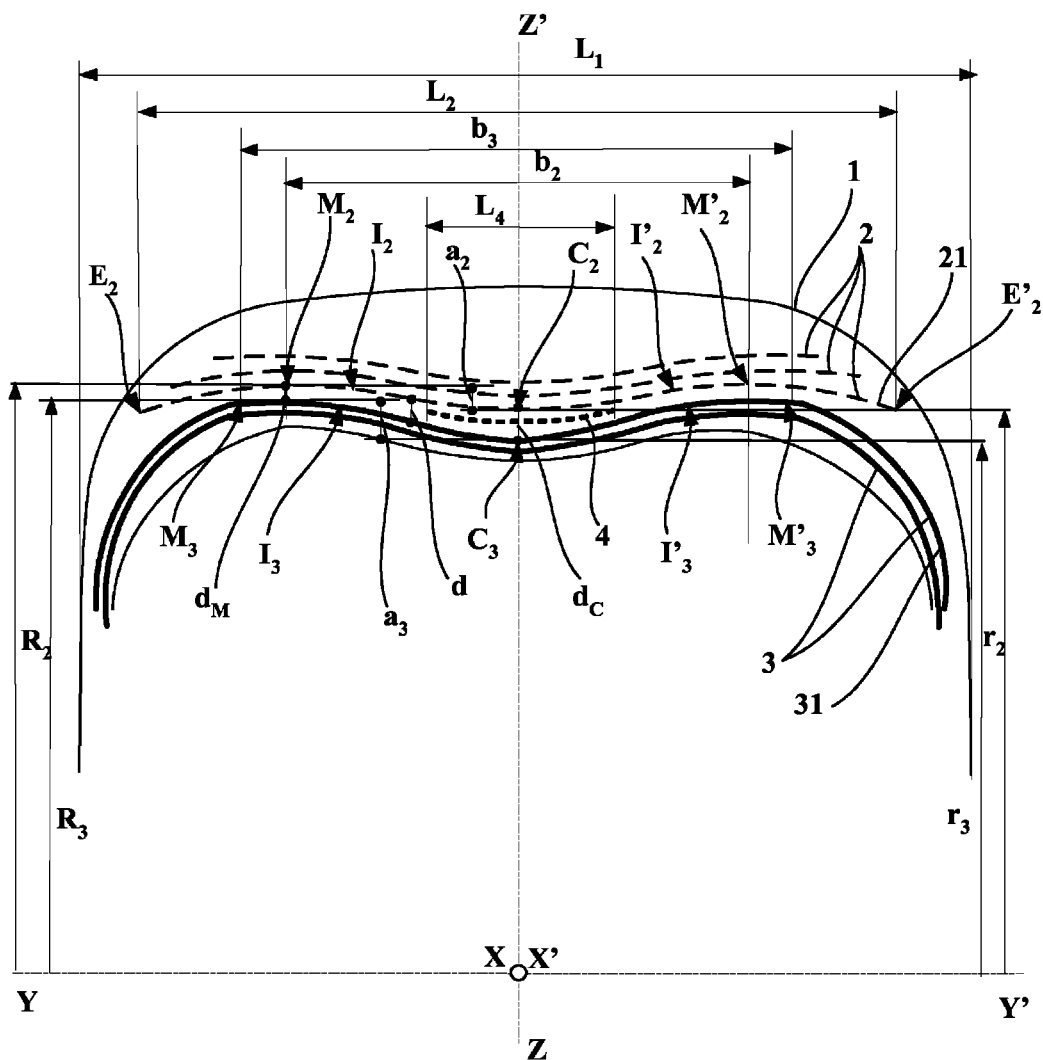

AEROPLANE TIRE WITH CROWN AND CARCASS BOTH HAVING A CONCAVE PORTION

This application is a 371 national phase entry of PCT/EP2012/073033, filed 20 Nov. 2012, which claims benefit of FR 1160892, filed 29 Nov. 2011, the entire contents of which is incorporated by reference herein for all purposes.

BACKGROUND

1. Field

The present disclosure relates to a tire for an aeroplane and in particular to the crown of a tire for an aeroplane.

2. Description of Related Art

A tire comprises a crown comprising a tread intended to come into contact with the ground via a tread surface, two beads intended to come into contact with a rim and two sidewalls connecting the crown to the beads. A radial tire, as is generally used for an aeroplane, more particularly comprises a radial carcass reinforcement and a crown reinforcement, both as described, for example, in document EP 1 381 525.

As a tire has a geometry exhibiting symmetry of revolution about an axis of rotation, the geometry of the tire is generally described in a meridian plane containing the axis of rotation of the tire. For a given meridian plane, the radial, axial and circumferential directions respectively denote the directions perpendicular to the axis of rotation of the tire, parallel to the axis of rotation of the tire, and perpendicular to the meridian plane.

In what follows, the expressions "radially on the inside of" and "radially interior" respectively signify "closer to the axis of rotation of the tire, in the radial direction, than" and "closest to the axis of rotation of the tire in the radial direction". The expressions "radially on the outside of" and "radially exterior" respectively signify "further away from the axis of rotation of the tire, in the radial direction, than" and "furthest from the axis of rotation of the tire, in the radial direction". The expressions "axially on the inside of" and "axially interior" respectively signify "closer to the equatorial plane, in the axial direction, than" and "closest to the equatorial plane, in the axial direction", the equatorial plane being the plane perpendicular to the axis of rotation of the tire and passing through the middle of the tread surface of the tire. Similarly, the expressions "axially on the outside of" and "axially exterior" respectively signify "further from the equatorial plane, in the axial direction, than" and "furthest from the equatorial plane, in the axial direction". A "radial distance" is a distance with respect to the axis of rotation of the tire, and an "axial distance" is a distance with respect to the equatorial plane of the tire. A "radial thickness" is measured in the radial direction, and an "axial width" is measured in the axial direction.

The radial carcass reinforcement is the tire reinforcing structure that connects the two beads of the tire. The radial carcass reinforcement of a tire for an aeroplane generally comprises at least one carcass reinforcing layer, referred to as the carcass layer. Each carcass layer is made up of reinforcing elements coated in a polymer material, parallel to one another and making with the circumferential direction an angle of between 80° and 100°. Each carcass layer is individual, i.e. contains just one reinforcing element within its thickness.

The crown reinforcement is the tire reinforcing structure radially on the inside of the tread and usually radially on the outside of the radial carcass reinforcement. The crown reinforcement for a tire of an aeroplane generally comprises at least one crown reinforcing layer, referred to as the crown layer. Each crown layer is made up of reinforcing elements coated in a polymer material, parallel to one another and making with the circumferential direction an angle of between +20° and −20°. Each crown layer is individual, i.e. contains just one reinforcing element in its thickness.

Of the crown layers, the distinction is made between the working layers that make up the working reinforcement, usually made up of textile reinforcing elements, and the protective layers that make up the protective reinforcement, made up of metal or textile reinforcing elements and arranged radially on the outside of the working reinforcement. The working layers govern the mechanical behaviour of the crown. The protective layers essentially protect the working layers from attack likely to spread through the tread radially towards the inside of the tire. A crown layer, particularly a working layer, is often an axially wide layer, i.e. one that has an axial width, for example, at least equal to two-thirds of the maximum axial width of the tire. The maximum axial width of the tire is measured at the sidewalls, with the tire mounted on its rim and lightly inflated, i.e. inflated to a pressure equal to 10% of the nominal pressure as recommended, for example, by the Tire and Rim Association or TRA.

The tire may also comprise a hooping reinforcement, radially on the inside or radially on the outside of the crown reinforcement, or even inserted between two crown layers. The hooping reinforcement of an aeroplane tire generally comprises at least one layer of hooping reinforcement, referred to as a hooping layer. Each hooping layer is made up of reinforcing elements coated in a polymer material, parallel to one another and making with the circumferential direction an angle of between +10° and −10°. A hooping layer is usually an axially narrow working layer, i.e. one that has an axial width which is appreciably smaller than the axial width of a crown layer and, for example, at most equal to half the maximum axial width of the tire.

The reinforcing elements of the carcass, working and hooping layers for aeroplane tires are usually cords made up of spun textile filaments, preferably made of aliphatic polyamides or aromatic polyamides. The reinforcing elements of the protective layers may be either cords consisting of metal threads or cords made up of spun textile filaments.

As far as the textile reinforcing elements are concerned, the mechanical tensile properties (modulus, elongation and braking force) of the textile reinforcing elements are measured after prior conditioning. What is meant by "prior conditioning" is that the textile reinforcing elements are stored for at least 24 hours prior to measurement, in a standard atmosphere in accordance with European standard DIN EN 20139 (temperature of 20±2° C.; relative humidity of 65±2%). The measurements are carried out in a known way using a ZWICK GmbH & Co (Germany) tensile testing machine of type 1435 or type 1445. The textile reinforcing elements are tensile tested over an initial length of 400 mm at a nominal rate of 200 mm/min. All the results are averaged over ten measurements.

Aeroplane tires often exhibit non-uniform tread wear, referred to as uneven wear, as a result of the demands made of them during the various phases of the life of the tire: take-off, taxiing and landing. It has been more particularly demonstrated that there is differential tread wear between a middle part and the two lateral parts of the tread, axially on the outside of the middle part. It is usually desirable for the wear in the middle part to be greatest and to govern the life of the tire. In some instances, the aforementioned differential wear exacerbates the wearing of the lateral parts of the tread, which then becomes predominant over the wear of the middle part, leading to premature withdrawal from service which is economically detrimental.

Those skilled in the art know that tire tread wear is dependent on various factors associated with the use and design of the tire. Wear is particularly dependent on the geometric shape of the contact patch via which the tire tread makes contact with the ground and on the distribution of mechanical stresses within this contact patch. These two parameters are dependent on the inflated meridian profile of the tread surface. The inflated meridian profile of the tread surface is the cross section through the tread surface, on a meridian plane, for a tire inflated to its nominal pressure and unladen.

In order to increase the life of the tire with respect to the differential wear of the middle part of the tread, a person skilled in the art has sought to optimize the geometric shape of the inflated meridian profile of the tread surface.

Document EP 1 163 120 discloses a crown reinforcement for an aeroplane tire in which attempts have been made to limit the radial deformations when the tire is being inflated to its nominal pressure, making it possible to limit the radial deformations of the inflated meridian profile of the tread surface. The radial deformations of the crown reinforcement when the tire is being inflated to its nominal pressure is successfully limited by increasing the circumferential tensile stiffnesses of the crown layers, this being obtained by replacing the crown layer reinforcing elements, which are usually made of aliphatic polyamides, with reinforcing elements made of aromatic polyamides. Because the moduli of elasticity of reinforcing elements made of aromatic polyamides are higher than those of reinforcing elements made of aliphatic polyamides, the elongations of the former, for a given tensile loading, are smaller than those of the latter.

The aforementioned document EP 1 381 525 proposes one approach which is to alter the geometric shape of the inflated meridian profile of the tread surface by altering the tensile stiffnesses of the crown and/or carcass layers. That document proposes the use of hybrid reinforcing elements, namely reinforcing elements made both of aliphatic polyamides and of aromatic polyamides, in place of the usual reinforcing elements made of aliphatic polyamides. These hybrid reinforcing elements have moduli of elasticity that are higher than those of the reinforcing elements made of aliphatic polyamides, and therefore have lower elongations, for a given tensile loading. The hybrid reinforcing elements are used in the crown layers to increase the circumferential tensile stiffnesses and/or in the carcass layers to increase the tensile stiffnesses in the meridian plane.

Document EP 1 477 333 proposes another approach which is to alter the geometric shape of the inflated meridian profile of the tread surface by axially altering the overall circumferential tensile stiffness of the crown reinforcement in such a way that the ratio between the overall circumferential tensile stiffnesses of the axially outermost parts of the crown reinforcement and of the middle part of the crown reinforcement lies within a defined range. The overall circumferential tensile stiffness of the crown reinforcement is a result of the combination of the circumferential tensile stiffnesses of the crown layers. The overall circumferential tensile stiffness of the crown reinforcement varies in the axial direction according to changes in the number of superposed crown layers. The proposed solution is based on an axial distribution of the overall circumferential tensile stiffnesses between the middle part and the axially outermost parts of the crown reinforcement, the middle part being stiffer than the axially outermost parts of the crown reinforcement. The reinforcing elements used in the crown or carcass layers are made of aliphatic polyamides, aromatic polyamides or are hybrid.

The technical solutions put forward in the three aforementioned documents of the prior art are still, however, insufficient in terms of reducing uneven tread wear of tires fitted to commercial airliners which have high demands placed upon them.

Document WO 2010000747 describes an aeroplane tire, the nominal pressure of which is higher than 9 bar and of which the deflection under nominal load is greater than 30%, comprising a tread having a tread surface, a crown reinforcement, comprising at least one crown layer, a carcass reinforcement comprising at least one carcass layer, the said tread surface, crown reinforcement and carcass reinforcement being respectively geometrically defined by initial meridian profiles. According to the invention, the initial meridian profile of the crown reinforcement is locally concave over a middle part of an axial width at least equal to 0.25 times the axial width of the crown reinforcement.

The technical solution described in document WO 2010000747 allows an increase in the wear life of an aeroplane tire by limiting the differential wear of the tread between a middle part and the lateral parts axially on the outside of this middle part.

While the tire lasts longer because the wear across the width of the tread is more even, its endurance performance needs to be guaranteed throughout its longer life thanks to this better wear pattern. In particular, the endurance of the crown of the tire, i.e. its ability to withstand over time the heavy mechanical demands placed on the tire, needs to be improved. Heavy mechanical demands means, for example and nonlimitingly, in the case of a commercial airliner tire, a nominal pressure in excess of 15 bar, a nominal load in excess of 20 tonnes and a maximum speed of 360 km/h.

SUMMARY

The inventors have set themselves the objective of improving the endurance of the crown of a tire for an aeroplane, when its life is increased as a result of an improvement in tread wear.

This objective has been achieved, according to embodiments of the invention, by a tire for an aeroplane comprising:

a tread, a crown reinforcement radially on the inside of the tread and comprising at least one crown layer, the radially interior crown layer having an axial width at least equal to two-thirds of the maximum axial width of the tire and comprising a concave portion of which the axial limits, on either side of the equatorial plane, are the radially exterior points of the said crown layer, a carcass reinforcement radially on the inside of the crown reinforcement and comprising at least one carcass layer, the radially exterior carcass layer comprising a concave portion of which the axial limits, on either side of the equatorial plane, are the radially exterior points of the said carcass layer, the radial distance between the respective concave portions of the radially interior crown layer and of the radially exterior carcass layer being at a maximum in the equatorial plane and decreasing continuously from the equatorial plane as far as the axial limits of the said concave portions axially closest to the equatorial plane, where it reaches a minimum value.

The crown reinforcement of a tire is generally made up of a plurality of radially superposed crown layers which, in a meridian plane of the tire, have axial widths that generally differ from one layer to another, so as to stagger the axial ends of the said crown layers. The crown reinforcement generally comprises at least one crown layer referred to as wide, i.e. with an axial width at least equal to two-thirds of the maximum axial width of the tire. The maximum axial width of the tire is measured at the sidewalls, with the tire mounted on its rim and lightly inflated, i.e. inflated to a pressure equal to 10% of the recommended nominal pressure.

The axial width of a crown layer is the axial distance between the end points of the crown layer. It is usually measured on a meridian section of tire, obtained by cutting the tire on two meridian planes. By way of example, a meridian section of tire has a thickness in the circumferential direction of around 60 mm at the tread.

In the tire according to embodiments of the invention, the radially interior crown layer, i.e., of all the crown layers, the crown layer radially furthest towards the inside, has an axial width at least equal to two-thirds of the maximum axial width of the tire: this is therefore a wide crown layer.

Furthermore, the radially interior crown layer comprises a concave portion of which the axial limits, on either side of the equatorial plane, are the radially exterior points of the said crown layer. These axial limits are generally substantially equidistant from the equatorial plane, i.e. substantially symmetric about the equatorial plane, give or take the manufacturing tolerances, but different distances on either side of the equatorial plane are not excluded. A wide crown layer is needed in order to have a concave portion of significant axial width.

A concave portion, in the meridian plane, comprises a radially interior point in the equatorial plane and two radially exterior points, one on either side of the equatorial plane, which are the axial limits of the concave portion. All of the points of the concave portion are therefore radially on the outside of the point positioned in the equatorial plane and radially on the inside of the points that are the axial limits of the concave portion.

A concave portion within the meaning of the invention is not a concave portion in the mathematical sense of the term. In effect it comprises a central part that is concave in the mathematical sense with, at every point on the said concave central part, a centre of curvature radially on the outside of the said concave central portion and, on either side of the concave central part, a lateral part that is convex in the mathematical sense with, at every point of the said convex lateral part, a centre of curvature that is radially on the inside of the said convex lateral portion. The concave central part is axially delimited by two points of inflection, one on either side of the equatorial plane. Each convex lateral part is delimited axially on the inside by a point of inflection and axially on the outside by an axial limit of the concave portion.

The presence of a concave portion entails the presence of two convex portions axially on the outside of the said concave portion. These convex portions are axially limited on the outside by the ends of the working layer.

The other crown layers, radially on the outside of the interior crown layer, often comprise a concave portion of axial width substantially equal to that of the concave portion of the radially interior crown layer. This in particular happens when the crown layers are adjacent two by two and not separated by interlayered elements, for example made of elastomeric material. The respective meridian profiles of the said crown layers are then parallel in pairs, i.e. equidistant over their entire respective axial widths.

Also according to embodiments of the invention, the radially exterior carcass layer comprises a concave portion of which the axial limits, on either side of the equatorial plane, are the radially exterior points of the said carcass layer.

The carcass reinforcement is generally made up of a superposition of carcass layers, each of them being anchored in each bead of the tire by being wrapped around a circumferential reinforcing element, generally made of metal, known as a bead wire. In the crown region, radially on the inside of the crown reinforcement, the radially exterior carcass layer, i.e. of the carcass layers the one that is radially furthest on the outside, thus comprises a concave portion of which the axial limits, on either side of the equatorial plane, are the radially exterior points of the said carcass layer. These axial limits are generally more or less equidistant from the equatorial plane, i.e. substantially symmetric about the equatorial plane, give or take the manufacturing tolerances, but different distances on either side of the equatorial plane are not excluded.

Moreover, the axial limits of the concave portion of the radially exterior carcass layer are not necessarily at the same axial distances, with respect to the equatorial plane, as the axial limits of the concave portion of the radially interior crown layer. In other words, the respective concave portions of the radially exterior carcass layer and of the radially interior crown layer do not necessarily have the same axial width.

In a way that is similar to the radially interior crown layer, the concave portion of the radially exterior carcass layer is not a portion that is concave in the mathematical sense of the word and comprises a concave central part axially positioned between two convex lateral parts.

As a result, the carcass layers radially on the inside of the exterior carcass layer, because they are adjacent two by two, will also have a concave portion of an axial width substantially equal to that of the concave portion of the radially exterior carcass layer.

An essential feature of embodiments of the invention is that the radial distance between the respective concave portions of the radially interior crown layer and of the radially exterior carcass layer is at a maximum in the equatorial plane and decreases continuously from the equatorial plane as far as the axial limits of the said concave portions axially closest to the equatorial plane, where it reaches a minimum value.

In other words, the respective concave portions of the radially interior crown layer and of the radially exterior carcass layer are not parallel, i.e. the radial distance between the said concave portions is not constant.

This radial distance is at a maximum in the equatorial plane, making it possible to guarantee space, at the equatorial plane, for the potential insertion of a hooping reinforcement, consisting of at least one hooping layer. Such a hooping reinforcement, positioned in this central region, has the purpose of limiting the radial movements of the carcass reinforcement at the centre, as the tire is inflated, and thus of obtaining radial movements of the tread surface that are of substantially constant amplitude across the entire axial width of the tread surface, something which encourages more even wear across the entire axial width of the tread surface.

This distance decreases continuously from the equatorial plane as far as the axial limits of the said concave portions, axially closest to the equatorial plane, where it reaches a minimum value. What is meant by the axial limits of the said concave portions axially closest to the equatorial plane is the axial limits of the narrowest concave portion. Specifically, the axial widths of the respective concave portions of the radially exterior carcass layer and of the radially interior crown layer are not necessarily equal so the distance between the concave portions is taken into consideration out to the axial limits of the narrowest concave portion.

The minimum distance reached at the axial limits of the narrowest concave portion means that the carcass reinforcement and the crown reinforcement can be brought as close as possible in the shoulder region of the crown. A first technical effect of this minimum distance is that of minimizing the overall radial thickness of the crown in this shoulder region, which is the region that experiences the highest thermal stresses. Reducing the radial thickness of the shoulder region makes it possible to reduce the temperature in this region and therefore to improve the endurance of the crown of the tire. A second technical effect of this minimum distance is that the carcass reinforcement and the crown reinforcement can be mechanically recoupled in the shoulder region. What is meant by mechanical recoupling is a more even distribution of the tensions reacted by the respective reinforcing elements of the radially interior crown layer and of the radially exterior carcass layer. This makes it possible to optimize the use of the mechanical strength potential of the respective reinforcing elements of the said layers. In addition, as far as the radially interior crown layer is concerned, the mechanical reaction of tension by the reinforcing elements of the said layer is re-equalized between the central portion and the lateral portions. Another advantage is the saving of weight by comparison with the reference tire, thanks to the reduction in the thickness of the crown at the shoulders: such a weight saving is of great importance in the aeronautical field.

The maximum radial distance between the concave portions is advantageously at least equal to 1.75 times, and preferably at least equal to 2.5 times, the minimum radial distance between the concave portions. A minimum ratio of 1.75 allows the potential for inserting a hooping reinforcement made up of a single hooping layer. A minimum ratio of 2.5 allows the potential insertion of a hooping reinforcement made up of two hooping layers.

It is particularly advantageous for the maximum radial distance between the concave portions to be at least equal to 2.3 mm, preferably at least equal to 3.3 mm.

A radial distance between two layers is measured between the neutral axes of the said layers. What is meant by a layer is an individual layer, i.e. a layer containing a single reinforcing element in its thickness. The neutral axis of an individual layer passes through the centres of the reinforcing elements, the cross section of which is assumed to be circular. In a conventional tire design, the crown, hooping or carcass layers have a minimum thickness of 1 mm. In the usual assumption where, at the equatorial plane, the radially interior crown layer and the radially exterior carcass layer, with respective thicknesses of 1 mm, are separated by a hooping reinforcement made up of a single hooping layer with a thickness of 1 mm and by a layer of polymer material, with a minimum thickness of 0.3 mm, the radial distance measured between the respective neutral axes of the radially interior crown layer and the radially exterior carcass layer is then at least equal to 2.3 mm. In the assumption that the hooping reinforcement is made up of at least two hooping layers, the said radial distance needs to be at least equal to 3.3 mm. The values of 2.3 mm and 3.3 mm therefore correspond to technological minima under the respective assumptions of a hooping reinforcement with one hooping layer or with two hooping layers.

It is also particularly advantageous for the minimum radial distance between the concave portions to be at least equal to 1.3 mm and at most equal to 2.5 mm.

At the axial limits of the concave portions, the radially interior crown layer and the radially exterior carcass layer, with respective thicknesses of 1 mm, are generally separated by a layer of polymer material, with a minimum thickness of 0.3 mm. Under this assumption, the minimum radial distance measured between the respective neutral axes of the radially interior crown layer and the radially exterior carcass layer is at least 1.3 mm. As the inventors are seeking effective recoupling between the radially interior crown layer and the radially exterior carcass layer, this minimum radial distance must not exceed 2.5 mm.

According to one advantageous embodiment of the invention, the amplitude of concavity of the radially interior carcass layer, defined as being the radial distance between the point positioned in the equatorial plane and one of the axial limits of the concave portion, is at least equal to 1 mm.

According to another advantageous embodiment of the invention, the amplitude of concavity of the radially exterior carcass layer, defined as being the radial distance between the point positioned in the equatorial plane and one of the axial limits of the concave portion, is at least equal to 1 mm.

The amplitude of concavity of a given layer is determined in such a way that the inflated meridian profile of the layer, i.e. the profile obtained after the tire has been inflated to its recommended nominal pressure, is substantially flat.

The amplitude of concavity defined is thus dependent on the nature of the material of which the reinforcing elements of the relevant layer are made, and in particular on the modulus of elasticity of the said material. The higher the modulus of elasticity, the lower the amplitude of concavity because, upon inflation, the radial movements of the concave portion will be relatively small. In the case of an aromatic polymer such as aramid, which has a high modulus of elasticity of the order of 70 GPa, an amplitude of concavity of around 2 mm is enough to limit the radial movement of the central part of the meridian profile upon inflation.

According to one preferred embodiment of the invention, the aeroplane tire comprises a hooping reinforcement comprising at least one hooping layer, the hooping layer having an axial width at most equal to half the maximum axial width of the tire and comprising reinforcing elements that are parallel to one another and inclined, with respect to the circumferential direction, by an angle of between +10° and −10°, such that the hooping reinforcement is radially on the inside of the concave portion of the radially interior crown layer and radially on the outside of the concave portion of the radially exterior carcass layer.

As described earlier, the hooping reinforcement in the centre further improves the evenness of wear between the centre and the edge of the tread surface, as compared with a design with concave portions of crown reinforcement and carcass reinforcement without hooping reinforcements, even further limiting the differential between the radial movements of the tread surface as the tire is inflated.

According to a preferred alternative form of this preferred embodiment, the hooping reinforcement comprises two hooping layers.

Advantageously, the reinforcing elements of a hooping layer are made of aliphatic polyamides, aromatic polyamides or a combination of aliphatic polyamides and of aromatic polyamides. In other words, the material of which the reinforcing elements of a hooping layer are made is generally nylon or aramid. The reinforcing elements may be made up of a single material or combine different materials. For example, they may combine spun filaments of nylon and of aramid, to make up reinforcements referred to as hybrid. These hybrid reinforcements advantageously combine the extension properties of nylon and of aramid. This type of material is advantageously used in the field of aeroplane tires because of their low density, allowing weight savings that are crucial in the aeronautical field.

It is also advantageous for the reinforcing elements of a crown layer to be made of aliphatic polyamides, aromatic polyamides or a combination of aliphatic polyamides and of aromatic polyamides, a crown layer comprising reinforcing elements that are parallel to one another and inclined, with respect to the circumferential direction, by an angle of between +20° and −20°.

It is finally advantageous for the reinforcing elements of a carcass layer to be made of aliphatic polyamides, aromatic polyamides or a combination of aliphatic polyamides and of aromatic polyamides, a carcass layer comprising reinforcing elements that are parallel to one another and perpendicular to the circumferential direction.

Once again, the material of which the reinforcing elements of a crown or carcass layer are made, nylon or aramid, is a material that is commonplace in the field of aeroplane tires and offers the advantage of lightness of weight.

BRIEF DESCRIPTION OF DRAWING

The features and other advantages of embodiments of the invention will be better understood from FIG. 1 which shows a meridian section of a crown of a tire according to the preferred embodiment of the invention, with a hooping reinforcement interposed between the respective concave portions of the radially interior crown layer and of the radially exterior carcass layer.

DETAILED DESCRIPTION OF SPECIFIC EMBODIMENTS

In order to make the invention easier to understand, FIG. 1 has been depicted in simplified form and not to scale.

FIG. 1 shows a meridian section, i.e. a section in a meridian plane, of the crown of a tire according to the invention comprising a tread 1, a crown reinforcement 2 radially on the inside of the tread 1, a radial carcass reinforcement 3 radially on the inside of the crown reinforcement 2 and a hooping reinforcement positioned radially between the crown reinforcement 2 and the radial carcass reinforcement 3.

The respective radial, axial and circumferential directions are the directions ZZ', YY' and XX'. The equatorial plane XZ is defined by the radial and circumferential directions.

The crown reinforcement 2 is made up of several crown layers of which the radially innermost one is the radially interior crown layer 21. The axial width $L_2$ of the radially interior crown layer 21, which is the axial distance between its axial ends $E_2$ and $E'_2$, is at least equal to two-thirds of the maximum axial width $L_1$ of the tire. The maximum axial width $L_1$ of the tire is measured at the sidewalls, with the tire mounted on its rim and lightly inflated, i.e. inflated to a pressure equal to 10% of its recommended nominal pressure.

The radially interior crown layer 21 comprises a concave portion of which the axial limits $M_2$ and $M'_2$, on either side of the equatorial plane XZ, are the radially exterior points of the said crown layer, positioned at the radial distance $R_2$. The radially interior crown layer 21 further comprises two convex portions axially on the outside of the said concave portion. These convex portions are respectively bounded axially on the inside by the axial limits $M_2$ and $M'_2$ of the concave portion and axially on the outside by the ends $E_2$ and $E'_2$ of the crown layer.

The concave portion of the radially interior crown layer 21 comprises a part that is concave in the mathematical sense, axially delimited by the points of inflection $I_2$ and $I'_2$, and, on either side of the said concave part, a part that is convex in the mathematical sense, axially bounded on the outside by an axial limit $M_2$ or $M'_2$ of the said concave portion. The axial width $b_2$ of the concave portion is the axial distance between the axial limits $M_2$ and $M'_2$ of the concave portion. The amplitude of concavity $a_2$ is the difference between the radial distance $R_2$ of the axial limits $M_2$ and $M'_2$ and the radial distance $r_2$ of the point $C_2$ situated in the equatorial plane XZ.

The carcass reinforcement 3 is made up of several carcass layers the radially outermost of which is the radially exterior carcass layer 31. In the crown region, radially on the inside of the crown reinforcement 2, the radially exterior carcass layer 31 comprises a concave portion of which the axial limits $M_3$ and $M'_3$, on either side of the equatorial plane XZ, are the radially exterior points of the said carcass layer, positioned at the radial distance $R_3$.

The concave portion of the radially exterior carcass layer 31 comprises a part that is concave in the mathematical sense, axially delimited by the points of inflection $I_3$ and $I'_3$, and, on either side of the said concave part, a part that is convex in the mathematical sense, bounded axially on the outside by an axial limit $M_3$ or $M'_3$ of the said concave portion. The axial width $b_3$ of the concave portion is the axial distance between the axial limits $M_3$ and $M'_3$ of the concave portion, which in the case depicted in FIG. 1 is greater than the axial width $b_2$ of the concave portion of the radial interior crown layer 21. The amplitude of concavity $a_3$ is the difference between the radial distance $R_3$ of the axial limits $M_3$ and $M'_3$ and the radial distance $r_3$ of the point $C_3$ situated in the equatorial plane XZ.

The radial distance $d_C$, between the radially interior points $(C_2, C_3)$ of the respective concave portions of the radially interior crown layer 21 and radially exterior crown layer 31 is the difference between the respective radial distances $(R_2, R_3)$ of $C_2$ and $C_3$.

Furthermore, FIG. 1 depicts a preferred embodiment of the invention in which a hooping reinforcement 4 is positioned radially between the radially interior crown layer 21 and the radially exterior carcass layer 31. This hooping reinforcement is characterized by a narrow axial width $L_4$, i.e. a width at most equal to half the maximum axial width $L_1$ of the tire.

The inventors have carried out the invention according to the preferred embodiment, with a hooping reinforcement, for an aeroplane tire of dimension 46×17R20, the use of which is characterized by a nominal pressure of 15.9 bar, a nominal static load of 20473 daN and a maximum reference speed of 225 km/h.

In the tire studied, the crown reinforcement is made up of seven crown layers, the reinforcing elements of which are of hybrid type. The radially interior crown layer has an axial width of 300 mm, namely 0.83 times the maximum axial width of the tire. The width of concavity of the said radially interior crown layer is 160 mm, and the amplitude of concavity is 7.3 mm.

The carcass reinforcement is made up of five carcass layers, of which the reinforcing elements are made of nylon. The radially exterior carcass layer has a width of concavity of 160 mm, and an amplitude of concavity of 10 mm.

The hooping reinforcement is made up of two hooping layers, of which the reinforcing elements are of hybrid type. The axial width of the hooping reinforcement is 56 mm, namely 0.15 times the maximum axial width of the tire.

The inventors have demonstrated by using finite element numerical simulation, on a tire running at a steady speed of 10 km/h, under a nominal static load of 20.5 tonnes and a nominal pressure of 15.9 bar, that the highest temperature measured at the shoulder at the end of the crown reinforcement decreases by at least 2° when the thickness of the crown in this shoulder region decreases by 2 mm. In other words, the saving on heat in this shoulder region is at least 2° C. when the thickness of the shoulder region is decreased by 2 mm. The weight of the tire is correspondingly reduced by around 1.7 kg, namely 2.25% of the weight of the tire.

The invention claimed is:

1. An aeroplane tire comprising:
   a tread,
   a crown reinforcement radially on the inside of the tread and comprising at least one crown layer,
   the radially interior crown layer having an axial width ($L_2$) at least equal to two-thirds of the maximum axial width ($L_1$) of the tire and comprising a concave portion of which the axial limits ($M_2$, $M'_2$), on either side of the equatorial plane, are the radially exterior points of the said radially interior crown layer,
   two beads and two sidewalls connecting the tread to the beads,
   a carcass reinforcement radially on the inside of the crown reinforcement and comprising at least one carcass layer, each carcass layer connecting the two beads,
   the radially exterior carcass layer comprising a concave portion of which the axial limits ($M_3$, $M'_3$), on either side of the equatorial plane, are the radially exterior points of the radially exterior carcass layer,
   wherein the radial distance (d) between the respective concave portions of the radially interior crown layer and of the radially exterior carcass layer is at a maximum in the equatorial plane and decreases continuously from the equatorial plane as far as the axial limits ($M_2$, $M'_2$) of the said concave portions axially closest to the equatorial plane, where it reaches a minimum value ($d_M$).

2. The aeroplane tire according to claim 1, wherein the maximum radial distance ($d_C$) between the concave portions is at least equal to 1.75 times the minimum radial distance ($d_M$) between the concave portions.

3. The aeroplane tire according to claim 2, wherein the maximum radial distance ($d_C$) between the concave portions is at least equal to 2.5 times the minimum radial distance ($d_M$) between the concave portions.

4. The aeroplane tire according to claim 1, wherein the maximum radial distance ($d_C$) between the concave portions is at least equal to 2.3 mm.

5. The aeroplane tire according to claim 4, wherein the maximum radial distance ($d_C$) between the concave portions is at least equal to 3.3 mm.

6. The aeroplane tire according to claim 1, wherein the minimum radial distance ($d_M$) between the concave portions is at least equal to 1.3 mm and at most equal to 2.5 mm.

7. The aeroplane tire according to claim 1, wherein an amplitude of concavity ($a_2$) of the radially interior crown layer, defined as being the radial distance between a point ($C_2$) positioned in the equatorial plane and one of the axial limits ($M_2$, $M'_2$) of the concave portion, is at least equal to 1 mm.

8. The aeroplane tire according to claim 1, wherein an amplitude of concavity ($a_3$) of the radially exterior carcass layer, defined as being the radial distance between the point ($C_3$) positioned in the equatorial plane and one of the axial limits ($M_3$, $M'_3$) of the concave portion, is at least equal to 1 mm.

9. The aeroplane tire according to claim 1, further comprising a hooping reinforcement comprising at least one hooping layer, each hooping layer having an axial width ($L_4$) at most equal to half the maximum axial width ($L_1$) of the tire and comprising reinforcing elements that are parallel to one another and inclined, with respect to a circumferential direction, by an angle of between +10° and −10°, wherein the hooping reinforcement is radially on the inside of the concave portion of the radially interior crown layer and radially on the outside of the concave portion of the radially exterior carcass layer.

10. The aeroplane tire according to claim 9, wherein the hooping reinforcement comprises two of the hooping layers.

11. The aeroplane tire according to claim 9, wherein the reinforcing elements of the at least one hooping layer are each made of aliphatic polyamides, aromatic polyamides, or a combination of aliphatic polyamides and of aromatic polyamides.

12. The aeroplane tire according claim 1, wherein each crown layer comprises reinforcing elements that are parallel to one another and inclined, with respect to a circumferential direction, by an angle of between +20° and −20°, wherein the reinforcing elements of the at least one crown layer are each made of aliphatic polyamides, aromatic polyamides, or a combination of aliphatic polyamides and of aromatic polyamides.

13. The aeroplane tire according to claim 1, wherein each carcass layer comprises reinforcing elements that are parallel to one another and perpendicular to a circumferential direction, wherein the reinforcing elements of the at least one carcass layer are each made of aliphatic polyamides, aromatic polyamides or a combination of aliphatic polyamides and of aromatic polyamides.

* * * * *